United States Patent [19] [11] 4,137,001
Fountain [45] Jan. 30, 1979

[54] CUTTER BLADE
[75] Inventor: Edgar A. Fountain, Charlotte, Mich.
[73] Assignee: General Motors Corporation, Detroit, Mich.
[21] Appl. No.: 792,686
[22] Filed: May 2, 1977
[51] Int. Cl.² .............................................. B26D 1/12
[52] U.S. Cl. ..................................... 407/115; 407/22; 407/39; 407/61
[58] Field of Search ................ 29/95, 96, 105, 105 A, 29/103 R, 103 B
[56] References Cited
U.S. PATENT DOCUMENTS

| 83,560 | 10/1868 | Smith | 29/96 |
|---|---|---|---|
| 1,648,380 | 11/1927 | Dover | 29/96 |
| 1,751,540 | 3/1930 | Cone | 29/103 B |
| 2,641,048 | 6/1953 | Vreeland | 29/95 R |

FOREIGN PATENT DOCUMENTS

| 876940 | 5/1953 | Fed. Rep. of Germany | 29/103 B |
|---|---|---|---|
| 477806 | 8/1915 | France | 29/105 A |
| 984738 | 2/1951 | France | 29/105 A |
| 420931 | 5/1947 | Italy | 29/105 A |
| 21405 of | 7/1914 | United Kingdom | 29/95 R |

Primary Examiner—Harrison L. Hinson
Attorney, Agent, or Firm—Donald F. Scherer

[57] ABSTRACT

Tooth forming blades for cutting hypoid pinion and ring gears, each including a pressure angle face and an end face which require periodic sharpening, and a front or cutting face including a predetermined rake angle formed along the full blade length and requiring no sharpening, the blades being adapted to being mounted in radial receiving slots formed in a cutter body aligned at their cutting ends and having overall lengths which vary in a random manner, affective to being individually replaced after being ground to a predetermined minimum length as a result of repeated sharpening operations.

4 Claims, 9 Drawing Figures

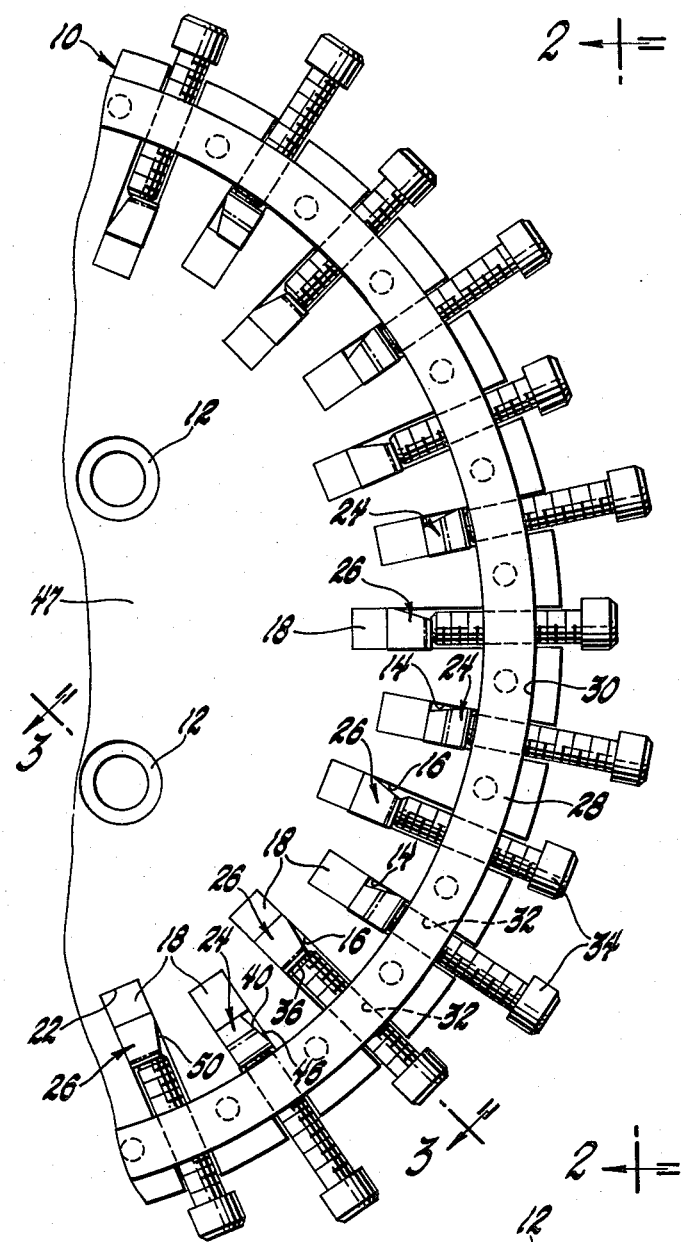
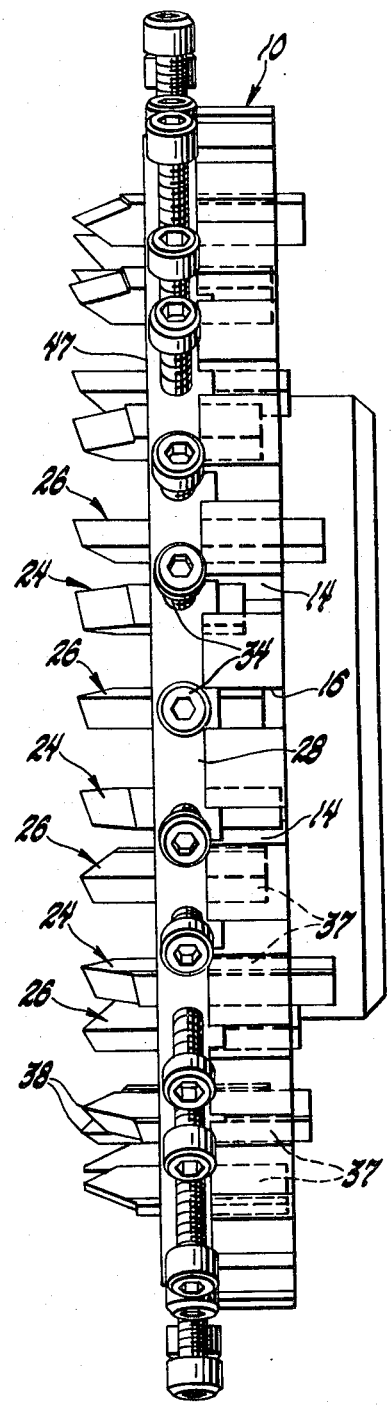
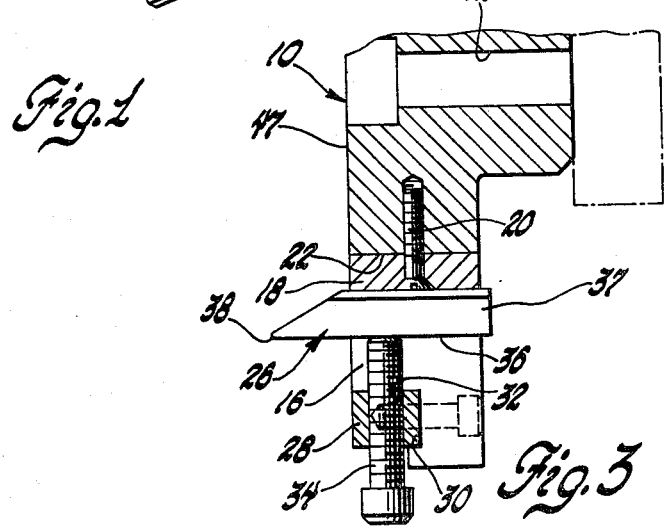
Fig. 1
Fig. 2
Fig. 3

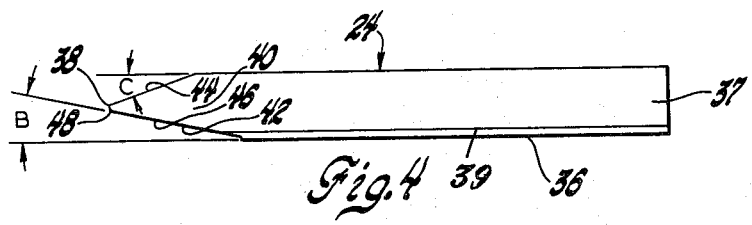
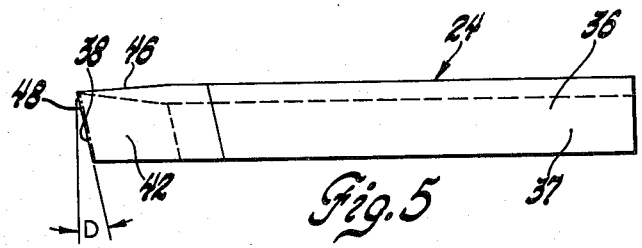
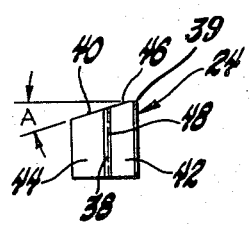
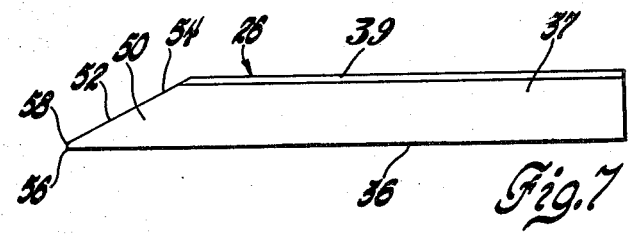
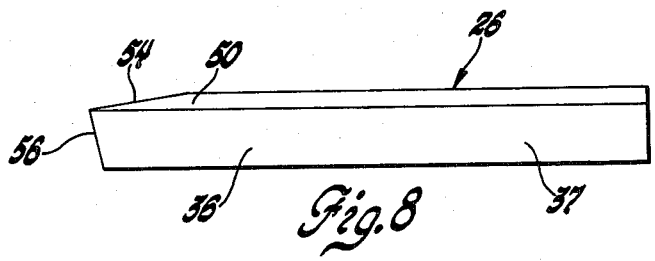
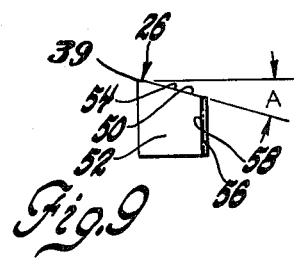

CUTTER BLADE

This invention relates generally to gear tooth forming and, more particularly, to tooth forming blades for use in face-mill type cutter bodies for cutting hypoid pinion and ring gears.

Heretofore, tooth forming blades used for cutting hypoid gears have generally fallen into two categories, namely (1) blades on which three operative surfaces formed on the cutting end thereof, i.e., a pressure angle face, a clearance angle face, and a rake angle or cutting face, all require periodic sharpening; and (2) blades on which of the same three operative surfaces forming on the cutting end thereof, only the pressure angle face and the clearance angle face require resharpening. A problem with the latter arrangement is that the cutter body in which such blades are mounted must include blade-receiving slots which are formed at particular angles other than radial in order to establish the required rake angle of the front or cutting face of the blade. Hence, a substantially more complicated cutter body is required for such a blade than is the case for the blade (1) above which may be mounted in radial slots formed in the cutter body.

A primary object of this invention is to provide an improved tooth forming blade which does not require the resharpening of the front or cutting face, but which may be mounted in radially formed slots formed in the cutter body.

Another object of the invention is to provide a tooth forming blade which includes at least a pressure angle face, an end radius, and a front or cutting face formed to include a predetermined rake angle along the full length of the blade, effective to permit the blade to be mounted in a radial slot formed in the cutter body, whether it be an inside or outside cutting blade, the latter including, additionally, a clearance angle face.

These and other objects and advantages of the invention will be apparent when reference is made to the following description and accompanying drawings wherein:

FIG. 1 is a front elevational view of a portion of a cutter body in which are mounted tooth forming blades embodying the invention;

FIGS. 2 and 3 are side elevational and cross-sectional views taken along the planes of the lines 2—2 and 3—3, respectively of FIG. 1, and looking in the direction of the arrows;

FIGS. 4, 5 and 6 are front, side and end views of an outside tooth forming blade embodying the invention; and FIGS. 7, 8 and 9 are front, side and end views of an inside tooth forming blade embodying the invention.

Referring now to the drawings in greater detail, FIGS. 1 and 2 illustrate a cutter body 10 having a plurality of equally spaced mounting holes 12 formed therein to enable the body 10 to be mounted on a suitable gear cutting machine (not shown). A plurality of equally spaced radial slots 14 and 16 of different depths are alternately formed around the outer periphery of the cutter body 10. Shims or spacers 18 of predetermined thicknesses may be secured by any convenient means, such as by screws 20, against the end face 22 of each radial slot 14 and 16, in order to accommodate different width outside and inside tooth forming blades 24 and 26, respectively, as determined by the particular size gears being cut. Such alternate outside and inside blades are used to cut oppositely disposed sides of the teeth of vehicular rear differential hypoid pinion and ring gears.

A ring 28 is mounted around the outer periphery of the cutter body 10, on a seat 30 formed thereon. A threaded opening 32 is formed in the ring 28 adjacent the center of each slot 14 and 16. A retainer screw 34 is threadedly mounted through each threaded opening 32 and abutted against the outer wall surface 36 of each blade 24 and 26 to rigidly retain the blades against the respective adjacent shims 18 or end faces 22. The front and rear wall surfaces of the blades conform to the widths of the respective radial slots 14 and 16, as shown in FIG. 1. As noted in FIG. 2, the tooth forming blades 24 and 26 have shanks or bodies 37 of uniform thickness and overall lengths which vary in a random manner, i.e., they need not be a matched set insofar as length is concerned since they are referenced from their working or cutting ends 38. Accordingly, the blades 24 and 26 may be individually replaced after they have been ground to be predetermined minimum length as a result of repeated sharpening operations.

Referring now to the outside blade 24 shown in FIGS. 4-6, it is noted that the blade is formed from a substantially rectangular cross section blank, and that the front wall thereof is machined along its full length and across substantially its full face width to form a surface at a predetermined angle with the remaining narrow front wall surface 39 shown in FIGS. 4 and 6. This forms the front or cutting face 40 of the blade, or the face of the blade over which the chip runs, at a predetermined rake angle A, or the angle best suited to reduce the cutting force required. As will be noted, this face need not have stock removed therefrom as the blade undergoes subsequent resharpening operations for as many times as there is sufficient length left in its shank or body portion.

A side face 42 and a side face 44 are formed adjacent one end of the outside blade 24 on the oppositely disposed side walls thereof, at a predetermined pressure angle B and clearance angle C, respectively, with respect to the planes of the side walls, the pressure angle being determined for the particular gear application involved. A cutting edge 46 is formed at the juncture or intersection of the side or pressure angle face 42 and the front or cutting face 40. The clearance angle merely accommodates the particular thickness of the blade involved and serves to clear the path of the oncoming pressure angle face of the inside blade. The end face 38 between the faces 42 and 44 is formed at a predetermined top relief angle D with respect to the plane of the outer surface 47 of the cutter body 10, and includes a radius 48 of a predetermined size formed adjacent the outer edge of the pressure angle face 42 for providing a desired clearance at the root between adjacent gear teeth.

The inside blade 26 (FIGS. 7-9) is similar to the outside blade 24 except for the fact that it does not include a clearance angle face but, rather, includes only a front or cutting face 50 formed along the full length thereof and pressure angle face 52 formed on the working end portion thereof adjacent the cutting face to form a cutting edge 54 therebetween. An angled end faces 56 having a radius 58 is formed at the outer edge of the pressure angle face 52, as in the case of the outside blade 24.

It should be noted that respective faces 42, 44 and 52 may be either cylindrically ground, i.e., sharpened while retained in a cylindrical holding fixture, or surface ground, i.e., sharpened while retained in a flat holding fixture, the resultant arcuate or flat surfaces 42, 44 and 52 being immaterial to the performance of good hypoid gear cutting operations.

As shown in FIG. 1, the cutting face 40 of the outside blade 24 has its rake angle A formed such that an extension of the plane of the cutting face 40 crosses the radius line between the blade and the center of the cutter body, while the cutting face 50 of the inside blade 26 has its rake angle A formed such that an extension of the plane of the face 50 crosses the radius line radially outwardly of the location of the blade. Furthermore, the pressure angle face of the outside blade is facing away from the center of the cutter body 10, while the pressure angle face 50 of the inside blade is facing toward the center of the cutter body 10, the respective cutting edges 46 and 54 thus facing in the same circumferential direction.

In some gear cutting applications, particularly for plunge cutting ring gears, it has been found to be desirable from a cutting load standpoint to include a tooth bottom cutting blade (not shown) mounted in a radial slot formed between the outside and inside blades which are spread apart to accommodate same. When such is the case, less operational power may be required to perform the cutting operation if the bottom cutting blade, as well as the outside and inside blades, and hence the radial slots 14 and 16 in which they are mounted, are tilted from vertical about the radial center line of each slot a predetermined amount between 0° and, say 16°.

While a particular cutter body 10 has been shown and described, other cutter body designs having spaced radial slots formed therein would be satisfactory. For example, Lank U.S. Pat. No. 2,468,562 illustrates a cutter body type which could be adapted to receive the inventive blades 24 and 26, enabling the blades to extend through the body and be referenced from their cutting ends without regard to the overall length thereof.

It should be apparent that the invention provides an improved tooth forming blade with fewer surfaces thereof requiring periodic sharpening, inasmuch as the front or cutting face need not be sharpened, and which is used in a simplified, radially slotted cutter body heretofore limited in application to blades requiring the sharpening of the front or cutting face thereof.

What is claimed is:

1. A tooth forming blade for machining hypoid pinion and ring gears, said blade comprising an elongated support shank including a front wall and oppositely disposed side walls and having a cutting end formed on one end thereof a side face formed on one of said side walls adjacent said cutting end at a predetermined pressure angle with respect to the plane of said one of said side walls, an end face formed on said cutting end at a predetermined relief angle with respect to the plane of a cross section of the blade, and a front face formed along the full length of said front wall of the blade at a predetermined rake angle with respect to said front wall, the intersection of said side and front faces constituting a cutting edge, and said side face and said end face being the only surfaces requiring resharpening during the operational life of said blade.

2. A tooth forming blade for machining hypoid pinion and ring gears, said blade comprising an elongated support shank including a front wall and oppositely disposed side walls and having a cutting end formed on one end thereof, a first side face formed on one of said side walls adjacent said cutting end at a predetermined pressure angle with respect to the plane of said one of said side walls, a second side face formed on the other of said side walls opposite said pressure angle side face at a predetermined clearance angle with respect to said other of side walls and forming an edge with said end face, an end face formed on said cutting end at a predetermined relief angle with respect to the plane of a cross section of the blade, and a front face formed along the full length of said front wall of the blade at a predetermined rake angle with respect to said front wall, the intersection of said first side and front faces constituting a cutting edge, and said first side face and said end face being the only surfaces requiring resharpening during the operational life of said blade.

3. A tooth forming blade for machining hypoid gears, said blade comprising an elongated support shank having a front wall and oppositely disposed parallel side walls and a cutting end formed on one end thereof, a front face formed at a predetermined rake angle with respect to said front wall, a side face formed on one of said side walls adjacent said cutting end at a predetermined pressure angle with respect to the plane of said one of said side walls, the intersection of said side and front faces constituting a cutting edge, and an end face formed on said cutting end at a predetermined relief angle with respect to the plane of a cross-section of the blade, said side face and said end face being the only surfaces requiring resharpening during the operational life of said blade.

4. A tooth forming blade for machining hypoid pinion and ring gears, said blade comprising an elongated support shank including a front wall and oppositely disposed side walls and having a cutting end formed on one end thereof, a side face formed on one of said side walls adjacent said cutting end at a predetermined pressure angle with respect to the plane of said one side wall, and end face formed on said cutting end at a predetermined relief angle with respect to the plane of a cross section of the blade, a predetermined radius formed on the edge between said end face and said side face, and a front face formed along the full length of said front wall of the blade at a predetermined rake angle with respect to said front wall, the intersection of said side and front faces constituting a cutting edge, and said side face, said end face and said radius being the only surfaces requiring resharpening during the operational life of said blade.

* * * * *